(12) United States Patent
Adam et al.

(10) Patent No.: US 7,368,046 B2
(45) Date of Patent: *May 6, 2008

(54) LAYERED COMPOSITE MATERIAL FOR PLAIN BEARINGS, PRODUCTION AND USE THEREOF

(75) Inventors: Achim Adam, Nauheim (DE); Klaus Staschko, Taunusstein-Seitzenhahn (DE)

(73) Assignee: Federal-Mogul Wiesbaden GmbH & Co. KG, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/568,109

(22) PCT Filed: Aug. 5, 2004

(86) PCT No.: PCT/DE2004/001766

§ 371 (c)(1),
(2), (4) Date: Feb. 13, 2006

(87) PCT Pub. No.: WO2005/015037

PCT Pub. Date: Feb. 17, 2005

(65) Prior Publication Data

US 2006/0286398 A1     Dec. 21, 2006

(30) Foreign Application Priority Data

Aug. 12, 2003 (DE) ................. 103 37 029

(51) Int. Cl.
C25D 7/10     (2006.01)
C25D 3/56     (2006.01)
F16C 33/12    (2006.01)

(52) U.S. Cl. .............. 205/181; 205/238; 205/242; 384/912; 428/642

(58) Field of Classification Search ............ None
See application file for complete search history.

(56) References Cited

U.S. PATENT DOCUMENTS

| | | | | | |
|---|---|---|---|---|---|
| 3,658,488 | A | * | 4/1972 | Brown et al. | 428/613 |
| 3,950,141 | A | * | 4/1976 | Roemer | 428/643 |
| 4,818,628 | A | * | 4/1989 | Alexander et al. | 428/561 |
| 4,832,801 | A | * | 5/1989 | Mori | 205/176 |
| 5,328,772 | A | * | 7/1994 | Tanaka et al. | 428/548 |
| 5,434,012 | A | * | 7/1995 | Tanaka et al. | 428/643 |
| 5,445,896 | A | * | 8/1995 | Tanaka et al. | 428/647 |
| 6,309,759 | B1 | * | 10/2001 | Tomikawa et al. | 428/642 |
| 6,510,726 | B1 | * | 1/2003 | Subramanyan et al. | 73/7 |

(Continued)

FOREIGN PATENT DOCUMENTS

DE     3719789 A1     12/1988

(Continued)

Primary Examiner—John J Zimmerman
(74) Attorney, Agent, or Firm—Robert L. Stearns; Dickinson Wright PLLC

(57) ABSTRACT

The invention is a method for the production of a composite multilayer material having a backing layer, a bearing metal layer of a copper alloy or an aluminum alloy, a nickel intermediate layer and an overlay consisting of about 0-20 wt. % copper and about 0-20 wt. % silver, the combined maximum wt. % of copper and silver being about 20 wt. %, the rest being bismuth, and the layer thickness of the nickel layer amounts to more than 4 μm by electrodeposition, in which the overlay is deposited from methyl sulphonic acid-based electrolyte.

8 Claims, 2 Drawing Sheets

⊢———⊣ 8 μm

U.S. PATENT DOCUMENTS

2001/0016267 A1* 8/2001 Huhn et al. ............... 428/647
2002/0031684 A1* 3/2002 Niegel et al. ............. 428/675
2003/0048961 A1* 3/2003 Kawachi et al. ........... 384/276
2004/0241489 A1* 12/2004 Kawachi et al. ........... 428/642

FOREIGN PATENT DOCUMENTS

| | | |
|---|---|---|
| DE | 3727591 A1 | 3/1989 |
| DE | 19728777 A1 | 4/1999 |
| DE | 19754221 A1 | 6/1999 |
| EP | 1113180 A2 | 7/2001 |
| JP | 11-050296 * | 2/1999 |

* cited by examiner

LAYERED COMPOSITE MATERIAL FOR PLAIN BEARINGS, PRODUCTION AND USE THEREOF

BACKGROUND OF THE INVENTION

1. Field of the Invention

The invention relates to a composite multilayer material, in particular for plain bearings or bushings, having a backing layer, a bearing metal layer of a copper alloy or an aluminum alloy, a nickel intermediate layer and an overlay. The invention additionally relates to a method for the production of the composite multilayer material, the production of plain bearings or bushings and uses for the composite multilayer material.

2. Related Art

Conventional composite multilayer materials with the structure comprising steel backing as backing layer, lead-bronze as bearing metal layer and overlay of lead-tin-copper, as described for example in Glyco-Ingenieurberichte 1/91 (Glyco Engineering Reports 1/91), have proven themselves as a result of their high reliability and mechanical load carrying capacity. In such a structure, the overlay is electrodeposited. Such an overlay is a multifunctional layer, in which foreign particles may be embedded, which serves as corrosion protection, which exhibits emergency running characteristics and which is particularly suitable for running-in or conforming of the sliding partners.

The bearing metal layer also exhibits adequate emergency running characteristics, in case the overlay is completely worn away, at least in places.

Conventional composite multilayer materials comprise a lead-based overlay, a common alloy being for example PbSn10Cu2. Such overlays exhibit low hardnesses of around 12-15 HV (Vickers Hardness), for which reason they have good embedding properties and are insensitive to seizure. For reasons of industrial safety and environmental protection, it is nonetheless desirable to replace the lead, which is a heavy metal, with other suitable materials.

One approach is to use hard layers as overlays in heavily loaded bearing systems. For example, aluminum-tin layers with hardnesses of around 80 HV are deposited using PVD (physical vapor deposition) methods. These are lead-free, but are very expensive to produce. Such bearings are highly wear-resistant, but they exhibit almost no embeddability and are therefore generally combined with soft, lead-containing layers as a counter-shell. However, it is also desirable to replace the lead in counter-shells with other materials.

Attempts have been made to use pure tin as a sliding surface. With a hardness of roughly 10 HV, however, pure tin is even softer than the conventional lead alloys and is therefore incapable of absorbing the loads which arise for example in crankshaft main bearings and connecting rod bearings.

DE 197 28 777 A1 describes a composite multilayer material for sliding elements, the overlay of which consists of a lead-free alloy containing tin and copper, wherein the copper content amounts to 3-20 wt. % and the tin content to 70-97 wt. %. This overlay is electrodeposited by means of a methylsulfonic acid electrolyte with grain refining additives. The overlay produced in this way has the characteristics of ternary lead-based overlays. In order further to improve wear resistance, DE 197 28 777 A1 additionally proposes providing hard material particles dispersed in the electrolyte bath, these being incorporated into the layer. However, this is associated with additional effort and cost. Between the bearing metal and the overlay it is possible to provide a 1-3 µm thick nickel layer together with a 2-10 µm thick nickel-tin layer as diffusion barrier layer.

DE 197 54 221 A1 discloses a composite multilayer material with an overlay comprising 3-30 wt. % copper, 60-97 wt. % tin and 0.5-10 wt. % cobalt. In this way, the mechanical load carrying capacity is further increased and embrittlement of the bonding layer between overlay and nickel diffusion barrier layer is prevented. The cobalt reduces the tendency of the tin to diffuse towards the nickel. The addition of cobalt to the alloy, however, makes the electrodeposition process more complex, which reduces process reliability. Furthermore, as in DE 197 28 777 A1 the 1-3 µm thick nickel layer may be combined with a 2-10 µm thick nickel-tin layer as diffusion barrier.

EP 1 113 180 A2 describes a composite multilayer material for plain bearings, whose overlay has a tin matrix into which tin-copper particles are incorporated, said particles consisting of 39-55 wt. % copper with the rest being tin. A characteristic feature of the composite multilayer material is, in addition, that not only is an intermediate layer of nickel of a thickness of 1-4 µm provided, but also a second 2-7 µm thick intermediate layer of tin and nickel is arranged between the nickel intermediate layer and the overlay. By means of the intermediate layers of nickel and tin-nickel, a system is produced which adapts itself to the load applied, load carrying capacity being increased, according to thermal conditions, by growth of the tin-nickel layer. This composite multilayer material may be used to produce products for higher loads in modern, highly supercharged diesel engines. However, the additional layer is associated with greater processing complexity during production of the composite multilayer material and thus higher costs.

A plain bearing is known from DE 100 32 624 A1 which comprises a bearing metal and an overlay of bismuth or bismuth alloy, which is intended to exhibit improved compatibility and fatigue strength. A crucial factor is a particular preferential orientation of the bismuth crystals, which is intended to have reduced brittleness and improved conformability relative to a random orientation of the crystals and relative to single crystals. Possible alloys to which reference may be made are alloys of bismuth with soft materials such as tin, indium, antimony and the like. However, these exhibit the risk that, where these materials are not distributed uniformly in the matrix, i.e. in the event of variations in concentration, low melting eutectics are formed. Therefore, the quantities added should be limited to 5 wt. %. In practice, however, it has become clear that eutectic formation occurs even below the 5 wt. % limit.

The object of the present invention is to overcome the disadvantages of the prior art.

SUMMARY OF THE INVENTION

It has emerged that the presence of further phases of copper and/or silver in the bismuth matrix increases wear resistance. Although the overlay does not contain any lead, its specific load carrying capacity and wear characteristics are comparable with or better than those of conventional lead-based layers. The overlay of the composite multilayer material according to the invention is conformable and exhibits a high degree of embeddability with regard to dirt particles. It is particularly advantageous that no low melting eutectics form in the overlay.

More precise investigations have additionally shown that bearings of this composite multilayer material stabilize themselves on the initially still relatively soft overlay in operation after running-in due to heating and form a higher strength surface. This takes place as a result of the formation of a layer containing bismuth and nickel through diffusion of the nickel into the overlay consisting substantially of bismuth. The resultant overlay is wear-resistant and has a high load carrying capacity. By starting with a nickel layer which is at least approximately 4 µm thick, it is ensured that the nickel layer is not wholly converted even after the running-in phase.

The metals copper and silver may be present separately or in combination in the bismuth matrix. Their total content should amount to between approximately 0.5 and 20 wt.%. Advantageously, the total content of copper and/or silver should amount to between approximately 2 and 8 wt. %.

Advantageously, the total content of copper and/or silver should amount to between approx. 2 and 8 wt. %.

The overlay should advantageously exhibit a layer thickness of approximately 5-25 µm. Layer thicknesses of approximately 4-6 µm are particularly preferred for the nickel intermediate layer as are layer thicknesses of approximately 6-14 µm for the bismuth overlay. With layer thicknesses of these orders of magnitude, it is ensured that neither the nickel layer nor the bismuth-based overlay is completely converted as a result of diffusion. This would lead to problems of adhesion or undesired interactions between the bismuth contained in the overlay and the bearing metal, for example in the case of lead- and tin-containing bearing metal it would lead to the formation of eutectics with very low melting points.

Advantageously, the bearing metals are copper-aluminum, copper-tin, copper-tin-lead, copper-zinc, copper-zinc-silicon, copper-zinc-aluminum, copper-aluminum-iron or copper-zinc alloys. Copper- or aluminum-based bearing metals are preferred, i.e. bearing metals whose copper or aluminum content is between 50 and 95 wt. %.

According to the invention, the composite multilayer material is produced in that the overlay is deposited from a methanesulfonic acid electrolyte onto a composite of backing, bearing metal and nickel intermediate layers, wherein the electrolyte contains a non-ionic wetting agent and a grain refining agent containing a carboxylic acid. Resorcinol is present in the electrolyte as an antioxidant. If the overlay is also to contain silver, thiourea has to be added as complexing agent. Thiourea shifts the deposition potential to the effect that silver and bismuth may be deposited together.

The grain refining agent used is preferably an agent based on an acrylic acid derivative and alkylaryl polyglycol ether. Such a grain refining agent is sold by Enthone OMI under the name additive L, Cerolyt BMM/T.

The nonionic wetting agent is significant above all in the case of copper-containing overlays. It is intended to prevent uncontrolled copper deposition, in particular on the bearing backing. Nonionic wetting agents based on aryl polyglycol ether and/or alkylaryl polyglycol ether have proven particularly useful. Such nonionic wetting agents are sold by Enthone OMI under the name additive N, Cerolyt BMM-T.

The plain bearings or bushings according to the invention exhibit the great advantage that an interdiffusion layer of bismuth and nickel forms on running-in under operating conditions, said layer increasing wear resistance. It is possible to encourage the interdiffusion layer to arise by artificial aging of the plain bearings or bushings. For this purpose, heat treatment at approx. 150°-170° C. has proven particularly useful, said heat treatment proceeding for two or more hours to a few days.

The composite multilayer material according to the invention is particularly suitable for the production of crankshaft main bearings and of connecting rod bearings, in particular for the large connecting rod eye.

DRAWINGS

The invention is explained in greater detail with reference to an Example and FIGS, in which.

DETAILED DESCRIPTION

After appropriate pretreatment, a nickel diffusion barrier layer is applied from a Watt's nickel electrolyte onto a prefabricated bearing of a composite of steel and a bearing metal of CuPb22Sn.

The bismuth-based overlay is electrodeposited onto the nickel intermediate layer produced in this way. The following aqueous-based electrolyte system is used for this purpose:

| | |
|---|---|
| $Bi^{3+}$ as bismuth methanesulfonate | 30-40 g/l |
| $Cu^{2+}$ as copper methanesulfonate | 1-5 g/l |
| $Ag^+$ as silver methanesulfonate | 0.1-2 g/l |
| methanesulfonic acid | 150-200 g/l |
| additive "N" (Cerolyt BMM-T) | 50-70 g/l |
| additive "L" (Cerolyt BMM-T) | 10-20 g/l |
| resorcinol | 2-3 g/l |
| thiourea | 30-150 g/l |

If silver methanesulfonate is omitted, so should thiourea be omitted.

Bismuth is used as anode material. The bath temperature for deposition of the overlay is 15-40° C. The current density used is $1.5\text{-}4\times10^{-2}$ A/m². The distance between the anode and the cathode amounts to 350 mm at most. The anode to cathode surface area ratio should be substantially 1:1 (+/− 10%).

Figure 1:
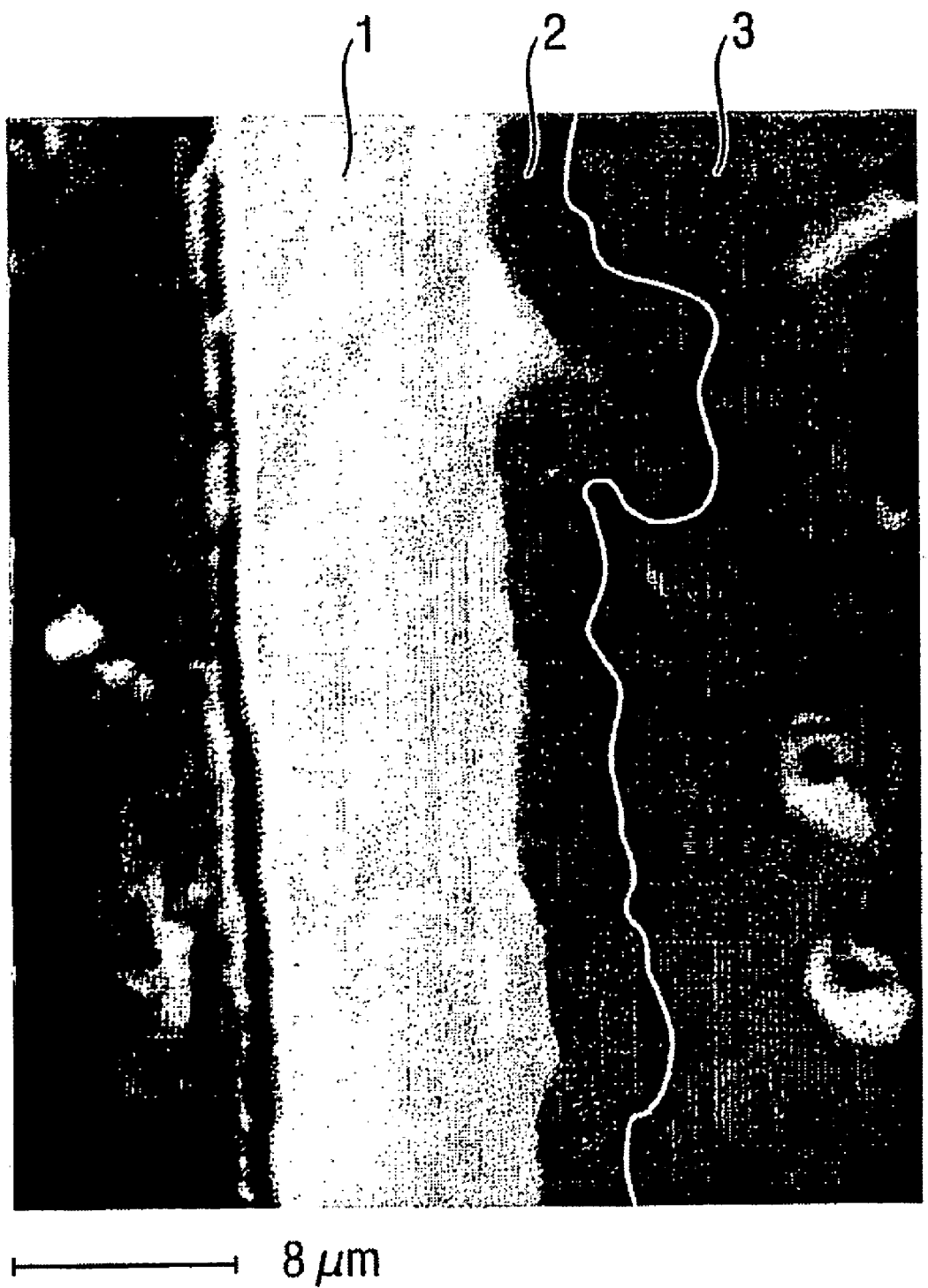
FIG. 1 shows a section through the bearing metal layer, nickel intermediate layer and overlay of a composite multilayer material according to the invention.

FIG. 1 is a sectional image of the layer structure of the composite multilayer material as described above, with silver methanesulfonate and thiourea being omitted. 1 designates the overlay of copper-bismuth of a thickness of 10.3 µm, 2 being the nickel-intermediate layer of a thickness of 4.2 µm and 3 being the bearing metal comprising CuPb22Sn.

The boundary line between the two layers 2 and 3 is shown with a white line for the sake of greater clarity.

Figure 2:
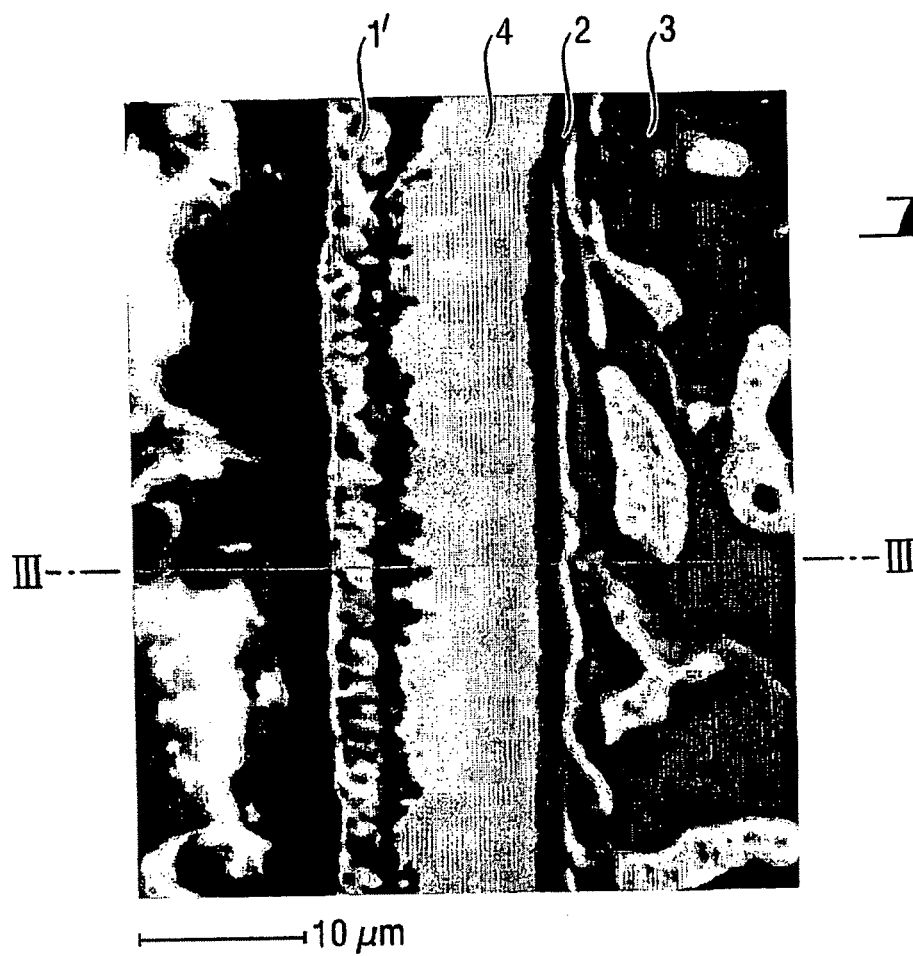
FIG. 2 shows a section through a bearing consisting of the composite multilayer material according to the invention after the running-in phase.
Figure 3:
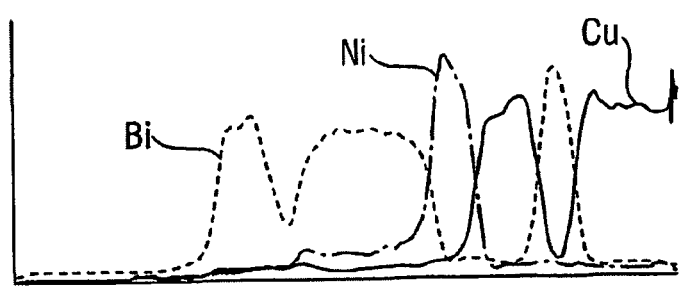
FIG. 3 shows the element distribution determined for the bearing according to FIG. 2 in the area III-III by energy-dispersive X-ray analysis.

FIG. 2 is a sectional image of a bearing of the composite multilayer material shown in FIG. 1 after the operating state has been established, i.e. after the running-in phase. To this end, the bearing was heat-treated for 500 hours at 150° C. The bismuth-nickel layer of a thickness of 8.5 µm designated 4 has arisen by diffusion, said layer resulting in a more wear-resistant sliding surface with a greater load carrying capacity. That said layer is a bismuth-nickel layer is confirmed by the energy-dispersive X-ray analysis results illustrated in FIG. 3. The distances on the X axis match the corresponding layer thicknesses in the area III-III of FIG. 2. The overlay 1' and the nickel layer 2 now have slightly smaller thicknesses of 3.6 µm and 2.4 µm respectively.

Underwood tests were carried out to assess the performance of bearings made from the composite multilayer material according to the invention. In these tests, a shaft with eccentric weights rotates in rigidly mounted connecting rods. The bearing system in the connecting rods takes the form of the test bearings. The test bearings have a wall thickness of 1.4 mm and a diameter of 50 mm. The specific load is adjusted over the bearing width. The speed of rotation amounts to 4000 rpm. Overlay fatigue and wear were measured after 250 hours of continuous operation. The results obtained in this test are listed in Table 1 (Example Nos. 5-8). For the purpose of comparison, the values are also indicated which are achieved with materials according to the prior art (Examples 1-4).

As is clear from the results listed in Table 1, the bearings made from composite multilayer material according to the invention are markedly superior to the conventional bearings with a lead-based overlay with regard to overlay fatigue, wear and maximum load to total wear. Bearings with a nickel intermediate layer of the thickness according to the invention exhibit, for the same top layer, a markedly higher load carrying limit capacity relative to bearings with a thinner nickel intermediate layer (c.f. Examples 4, 5). The additional use of silver and copper additives improves wear resistance significantly relative to pure bismuth overlays (Examples 5-8).

TABLE 1

|  | Prior art | | | | According to the invention | | | |
| --- | --- | --- | --- | --- | --- | --- | --- | --- |
| Ex. No. | 1 | 2 | 3 | 4 | 5 | 6 | 7 | 8 |
| Composition | PbSn5Cu2 | PbSn10Cu5 | PbSn14Cu8 | Bi | Bi | BiCu3 | BiAg5 | BiCu2Ag2 |
| Thickness of Ni layer in µm | 1 | 2 | 1.5 | 1.5 | 5 | 4.5 | 6 | 5 |
| Max. last in MPa without overlay fatigue | 52.5 | 60 | 65 | 50 | 75 | 77.5 | 80 | 80 |
| Wear in µm at 60 MPa | 15 | 11 | 9 | 8 | 3 | 2 | 2 | 3 |
| Max. load in MPa to total wear of overlay | 60 | 67.5 | 80 | 75 | 82.5 | 92.5 | 95 | 95 |

The invention claimed is:

1. A method for the production of a composite multilayer material having a backing layer, a bearing metal layer of a copper alloy or an aluminum alloy, a nickel intermediate layer and an overlay consisting of about 0-20wt. % copper and about 0-20wt. % silver, the combined maximum wt. % of copper and silver being about 20wt. %, the rest being bismuth, and the layer thickness of the nickel layer amounts to more than 4 µm by electrodeposition, in which the overlay is deposited from an aqueous-based electrolyte system comprising:

| 20-100 g/l | bismuth methanesulfonate, |
| --- | --- |
| 0.1-30 g/l | copper methanesulfonate, |
| 0.1-2 g/l | silver methanesulfonate, |
| 80-250 g/l | methanesulfonic acid, |
| 20-100 g/l | nonionic wetting agent, |
| 5-40 g/l | grain refining agent, |
| 1-4 g/l | resorcinol, and |
| 30-150 g/l | thiourea. |

2. The method as claimed in claim 1, wherein the grain refining agent is based on an acrylic acid derivative and alkylaryl polyglycol ether.

3. The method as claimed in claim 1, wherein the nonionic wetting agent is based on aryl polyglycol ether and/or alkylaryl polyglycol ether.

4. The method as claimed in claim 1 further including forming the composite multilayer material into plain bearings or bushings.

5. The method of claim 4 further including heat treating the plain bearings or bushings for two or more hours.

6. The method of claim 5 further including maintaining the temperature during heat treatment between 150-170° C.

7. The method of claim 4 further including forming the bearings as crankshaft main bearings.

8. The method of claim 4 further including forming the bearings as connecting rod bearings.

* * * * *